United States Patent
Mondal et al.

(10) Patent No.: US 12,265,891 B2
(45) Date of Patent: Apr. 1, 2025

(54) METHODS AND APPARATUS FOR AUTOMATIC ATTRIBUTE EXTRACTION FOR TRAINING MACHINE LEARNING MODELS

(71) Applicant: Walmart Apollo LLC, Bentonville, AR (US)

(72) Inventors: Sakib Abdul Mondal, Bangalore (IN); Tuhin Bhattacharya, Kolkata (IN); Abhijit Mondal, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 1148 days.

(21) Appl. No.: 17/116,698

(22) Filed: Dec. 9, 2020

(65) Prior Publication Data

US 2022/0180246 A1    Jun. 9, 2022

(51) Int. Cl.
*G06N 20/00* (2019.01)
*G06N 5/04* (2023.01)

(52) U.S. Cl.
CPC .............. *G06N 20/00* (2019.01); *G06N 5/04* (2013.01)

(58) Field of Classification Search
CPC .................................. G06N 20/00; G06N 5/04
See application file for complete search history.

(56) References Cited

U.S. PATENT DOCUMENTS

| 10,235,449 | B1 | 3/2019 | Viswanathan et al. |
| 2019/0066185 | A1 | 2/2019 | More et al. |
| 2019/0385052 | A1* | 12/2019 | Bauer, Jr. ................. G06N 7/01 |
| 2020/0057958 | A1* | 2/2020 | Moore .................... G06N 20/20 |

(Continued)

OTHER PUBLICATIONS

Biadsy, Naseem, Lior Rokach, and Armin Shmilovici. "Transfer learning for content-based recommender systems using tree matching." Availability, Reliability, and Security in Information Systems and HCI: IFIP WG 8.4, 8.9, TC 5 International Cross-Domain Conference, CD-ARES 2013. (Year: 2013).*

(Continued)

*Primary Examiner* — Michael W Ayers
*Assistant Examiner* — Nicholas S Wu
(74) *Attorney, Agent, or Firm* — Morgan, Lewis & Bockius LLP; Manita Rawat (57) ABSTRACT

This application relates to apparatus and methods for training machine learning models using supervised, or semi-supervised, learning. In some examples, a computing device obtains training data that includes labelled, and unlabeled, data for training a machine learning model. The computing device applies the machine learning model to the training data to generate output data. The machine learning model executes with a plurality of coefficients applied to a plurality of hyperparameters. The computing device further applies a loss model to the training data and the output data to generate a loss value. Based on the loss values, the computing device determines updated values for the plurality of coefficients of the machine learning model. The computing device may continue to determine updated values for the plurality of coefficients until one or more conditions are satisfied. The computing device may then store the final coefficient values in a data repository.

18 Claims, 6 Drawing Sheets

(56) References Cited

U.S. PATENT DOCUMENTS

2020/0372342 A1\* 11/2020 Nair .................... G06F 16/2246
2021/0232980 A1\* 7/2021 Velagapudi ........... G06F 18/217

OTHER PUBLICATIONS

Hsu, Chih-Chung, and Chia-Wen Lin. "Unsupervised convolutional neural networks for large-scale image clustering." 2017 IEEE International Conference on Image Processing (ICIP). IEEE, 2017. (Year: 2017).\*

Guo, Haonan, et al. "Learning automata based incremental learning method for deep neural networks." IEEE Access 7 (2019): 41164-41171. (Year: 2019).\*

Srinivasan, Aishwarya "Stochastic Gradient Descent Clearly Explained" (2019), Medium, Towards Data Science. (Year: 2019).\*

Li, Mu, et al. "Scaling distributed machine learning with the parameter server." 11th USENIX Symposium on operating systems design and implementation (OSDI 14). 2014. (Year: 2014).\*

Wang et al., "Graph Interpolating Activation Improves Both Natural and Robust Accuracies in Data-Efficient Deep Learning", (2019) p. 1-34.

Lin et al., "Shoestring: Graph-Based Semi-Supervised Classification with Severely Limited Labeled Data", (2020) p. 4321-4329.

Kickview Tech Blog, "No GPU Required: Real-Time Inference with Optimized Networks in kvSonata", (2019) p. 1-5.

Belkin et al., "Manifold Regularization: A Geometric Framework for Learning from Labeled and Unlabeled Examples", (2006) p. 1-36.

\* cited by examiner

METHODS AND APPARATUS FOR AUTOMATIC ATTRIBUTE EXTRACTION FOR TRAINING MACHINE LEARNING MODELS

TECHNICAL FIELD

The disclosure relates generally to machine learning models and, more specifically, to training machine learning models.

BACKGROUND

Machine learning models are typically trained before deployment. For example, machine learning models may be trained with supervised, or unsupervised, data. Machine learning models are trained such that, during inference, they may more reliably generate predicted outputs. Training machine learning models, however, consumes resources, such as processing resources and time. For example, training data must be collected, and computing devices must then train the machine learning models with the training data. For example, a machine learning model's hyperparameters may be trained using supervised, or unsupervised, learning. Supervised learning may require labelling training data, such as generating training data with manually created labels. Unsupervised learning, which typically does not require training data to be labeled, may suffer from lower levels of accuracy compared to supervised learning. In addition, the amount of processing resources required may be dependent on the amount of training data needed to sufficiently train a machine learning model, which may be quite large. Often times, to decrease the amount of time required for training, more expensive resources, such as Graphical Processing Units (GPUs), may be employed to train the machine learning models. Although semi-supervised training methods have been proposed, they may suffer from similar drawbacks. As such, there are opportunities to improve machine learning model training.

SUMMARY

The embodiments described herein are directed to training machine learning models using innovative based approaches, such as semi-supervised based approaches, to train the machine learning models. The embodiments may employ, for example, iterative methods, such as stochastic gradient descent (SGD) based methods, to train the machine learning models. The embodiments may reduce cross-entropy losses, such as by more quickly reaching a particular cross-entropy loss level. In addition, the embodiments may allow machine learning models to be trained in less time with fewer, or less expensive, processing resources. Moreover, the embodiments may provide a more accurately trained machine learning model, which allows for more accurate predictions during inference.

In some applications, the embodiments allow for more accurate, and faster, training of logistic regression based machine learning models. The trained logistic regression based machine learning models may be employed to classify natural text, such as text related to product information. The classified text may be employed by machine learning models to determine, for example, item recommendations to advertise to a user browsing a retailer's website. The item advertisements may be displayed to the user on a homepage, or item webpage, the user is browsing, for example. In some examples, the classified text may be employed by machine learning models to determine search results for the user in response to a search request. Moreover, the embodiments may allow the trained logistic regression based machine learning models to be occasionally retrained with additional training data (e.g., such as training data collected since the logistic regression based machine learning models were previously trained) in a more efficient (e.g., faster) manner. In addition to or instead of these example advantages, persons of ordinary skill in the art would recognize and appreciate other advantages as well.

In accordance with various embodiments, exemplary systems may be implemented in any suitable hardware or hardware and software, such as in any suitable computing device. For example, in some embodiments, a computing device obtains training data that includes labelled, and unlabeled, data for training a machine learning model. The computing device applies the machine learning model to the training data to generate output data. The machine learning model executes with a plurality of coefficients applied to a plurality of hyperparameters. The computing device further applies a loss model to the training data and the output data to generate a loss value. Based on the loss values, the computing device determines updated values for the plurality of coefficients of the machine learning model. The computing device may continue to determine updated values for the plurality of coefficients until one or more conditions are satisfied. The computing device may then store the final coefficient values in a data repository.

In some embodiments, a computing device is configured to obtain training data for training a machine learning model comprising a plurality of hyperparameters and a plurality of coefficients, and generate a first training dataset based on the obtained training data. The computing device is also configured to apply the machine learning model to the first training dataset to generate first output data. Further, the computing device is configured to apply a loss algorithm to the first training dataset and the first output data to generate a first loss value. The computing device is also configured to determine a first updated value for each of the plurality of coefficients based on the first loss value and a corresponding previous value of each of the plurality of coefficients. The computing device is further configured to store the first updated value for each of the plurality of coefficients in a data repository.

In some embodiments, a method is provided that includes obtaining training data for training a machine learning model comprising a plurality of hyperparameters and a plurality of coefficients, and generating a first training dataset based on the obtained training data. The method also includes applying the machine learning model to the first training dataset to generate first output data. Further, the method includes applying a loss algorithm to the first training dataset and the first output data to generate a first loss value. The method also includes determining a first updated value for each of the plurality of coefficients based on the first loss value and a corresponding previous value of each of the plurality of coefficients. The method further includes storing the first updated value for each of the plurality of coefficients in a data repository.

In yet other embodiments, a non-transitory computer readable medium has instructions stored thereon, where the instructions, when executed by at least one processor, cause a computing device to perform operations that include obtaining training data for training a machine learning model comprising a plurality of hyperparameters and a plurality of coefficients, and generating a first training dataset based on the obtained training data. The operations also include applying the machine learning model to the first training dataset to generate first output data. Further, the operations include applying a loss algorithm to the first training dataset and the first output data to generate a first loss value. The operations also include determining a first updated value for each of the plurality of coefficients based on the first loss value and a corresponding previous value of each of the plurality of coefficients. The operations further include storing the first updated value for each of the plurality of coefficients in a data repository.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Figure 1:
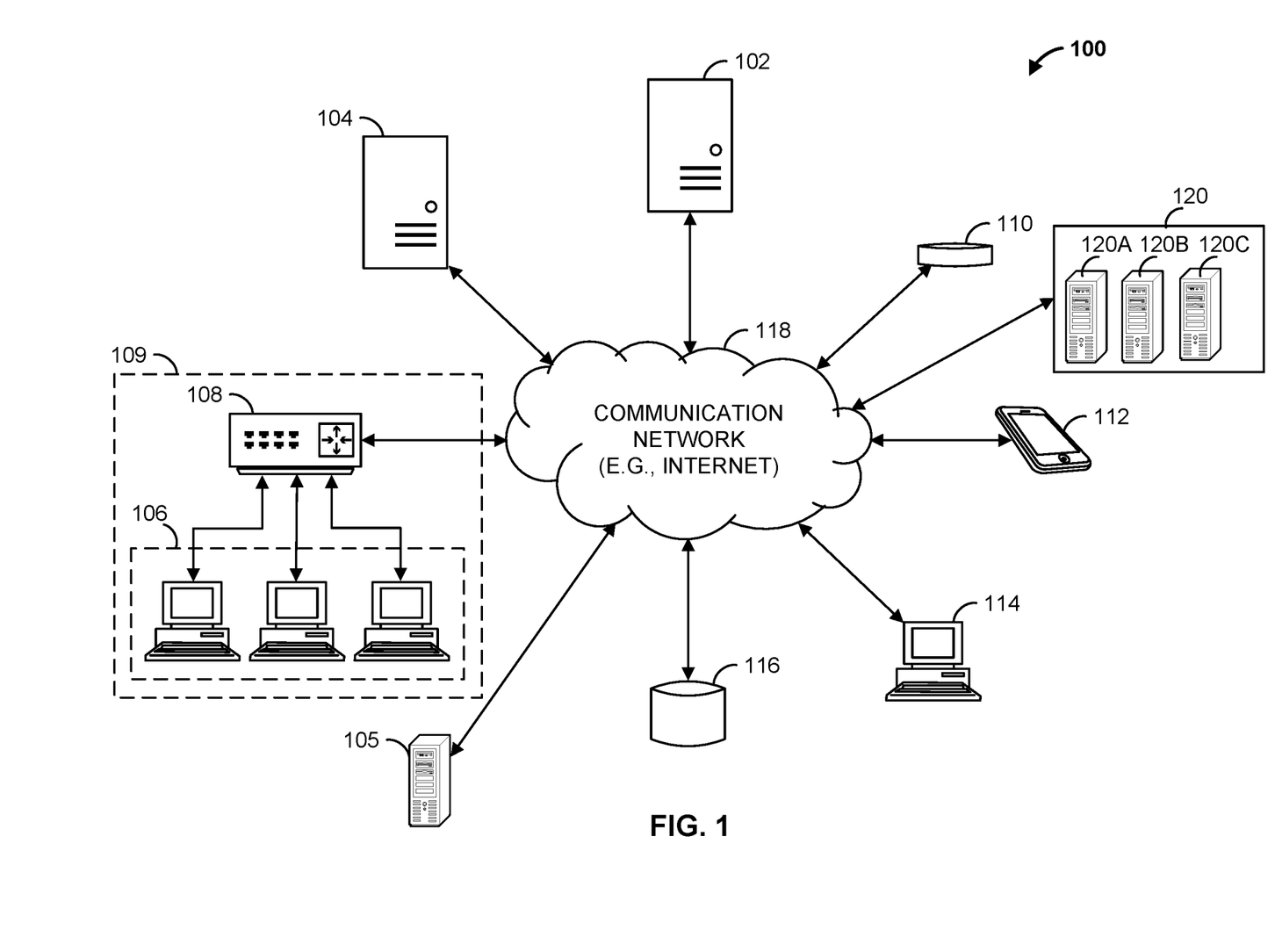
FIG. 1 is a block diagram of an advertisement system in accordance with some embodiments.

Turning to the drawings, FIG. 1 illustrates a block diagram of an advertisement system 100 that includes an machine learning (ML) model training computing device 102 (e.g., a server, such as an application server), a web server 104, workstation(s) 106, database 116, an item recommendation system 105, ML training servers 120A, 120B, 120C, and multiple customer computing devices 110, 112, 114 operatively coupled over communication network 118. Further, each ML training server 120A, 120B, 120C may be a cloud server that is part of cloud 120.

ML model training computing device 102, workstation(s) 106, web server 104, item recommendation system 105, ML training servers 120A, 120B, 120C, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

In some examples, ML model training computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, ML model training computing device 102, item recommendation system 105, and web server 104 are operated by a retailer, and multiple customer computing devices 112, 114 are operated by customers of the retailer. Cloud 120 may be operated by a cloud provider, such as a cloud provider that charges for the user of ML training servers 120A, 120B, 120C. In some examples, cloud 120 is operated by the retailer.

Although FIG. 1 illustrates three customer computing devices 110, 112, 114, advertisement system 100 can include any number of customer computing devices 110, 112, 114. Similarly, advertisement system 100 can include any number of workstation(s) 106, ML model training computing devices 102, web servers 104, item recommendation systems 105, ML training servers 120A, 120B, 120C and/or clouds 120, and databases 116.

Item recommendation system 105 may be operable to generate item recommendations, such as a plurality of recommended items (or item categories) to advertise to a user. For example, item recommendation system 105 may apply one or more machine learning models to customer session data, customer purchase data, and product data to generate item recommendations for that customer.

Workstation(s) 106 is operably coupled to communication network 118 via router (or switch) 108. Workstation(s) 106 and/or router 108 may be located at a store 109, for example. Workstation(s) 106 can communicate with item recommendation system 105 over communication network 118, for example. The workstation(s) 106 may send data to, and receive data from, item recommendation system 105. For example, the workstation(s) 106 may transmit purchase data related to orders purchased by customers at store 109 to item recommendation system 105. In some examples, item recommendation system 105 may transmit, in response to received purchase data, an indication of one or more recommended items to advertisement to a customer. For example, the item advertisements may be displayed on a receipt handed to the customer for the purchase order.

In some examples, web server 104 hosts one or more websites, such as a retailer's website. Customers, via one or more customer computing devices 110, 112, 114, may access the website, which may allow customers to purchase items. For example, the website may advertise items for sale. The website may allow customers to add items to an online shopping cart, and purchase the items within the online shopping cart. Further, the website may include advertisements for the items. In some examples, web server 104 advertises items regardless of the customer viewing the website. In some examples, web server 104 provides for display personalized item advertisements to a customer visiting the website. For example, web server 104 may identify a customer visiting the website, and request from item recommendation system 105 item recommendations to advertise to the customer. Once the request is received, item recommendation system 105 may transmit one or more of the recommended items to web server 104. In response, web server 104 may present advertisements for the one or more recommended items to the customer on the website.

Further, web server 104 may transmit to item recommendation system 105 customer session data related to web-based activities of customers visiting the websites. Customer session data may identify, for example, item engagements (e.g., item and advertisement clicks, item and advertisement impressions, add-to-cart (ATC) events, etc.), and search queries, for a customer (e.g., caused by the customer's engagement with the website). Web server 104 may also transmit to item recommendation system 105 purchase data related to orders purchased on the website by customers. Item recommendation system 105 may aggregate the customer session data and purchase data for the customer within a portion of a data repository, such as within database 116.

Each of ML model training computing device 102 and item recommendation system 105 are operable to communicate with database 116 over communication network 118. For example, ML model training computing device 102 can store data to, and read data from, database 116. Database 116 can be one or more remote storage devices, such as a cloud-based server, a disk (e.g., a hard disk), a memory device on another application server, a networked computer, or any other suitable remote storage. Although shown remote to each of item recommendation system 105 and ML model training computing device 102, in some examples, database 116 can be a local storage device, such as a hard drive, a non-volatile memory, or a USB stick on each of item recommendation system 105 and ML model training computing device 102.

Item recommendation system 105 may store purchase data received from store 109 and/or web server 104 in database 116. Item recommendation system 105 may also store customer session data identifying events associated with browsing sessions, such as when a customer browses a website hosted by web server 104. In some examples, database 116 stores one or more machine learning models that, when executed by item recommendation system 105, allows item recommendation system 105 to determine one or more item recommendations, or search results in response to a search query, for a customer (e.g., such as a customer browsing a webpage hosted by web server 104). The machine learning models (e.g., algorithms) may include, for example, Generative Adversarial Networks (GANs), decision tree models, neural networks (e.g., ANNs, CNNs), support vector machines, or any other suitable machine learning models.

ML model training computing device 102 is operable to train any of the machine learning models stored within database 116. ML model training computing device 102 may train a machine learning model using a supervised, or semi-supervised, approach. For example, ML model training computing device 102 may obtain aggregated data, such as customer session data, customer purchase data, and product data, from database 116, which may include labelled data and/or unlabeled data. ML model training computing device 102 may further obtain an untrained machine learning model from database 116, and may train the obtained machine learning model based on the aggregated data. In some examples, ML model training computing device 102 may employ processing resources of one or more of ML training servers 120A, 120B, 120C of cloud 120 to train the machine learning model. For example, ML model training computing device 102 may schedule one or more processing tasks among one or more processing devices (e.g., CPUs or GPUs) of ML training servers 120A, 120B, 120C to train the machine learning model. The training may generate values for one or more weights applied to hyperparameters of the machine learning model, as described herein. In some examples, only CPUs are employed to train a machine learning model.

ML model training computing device 102 may store the trained machine learning model in database 116. Item recommendation system 105 may obtain the trained machine learning model from database 116, and may execute the trained machine learning model to generate item recommendations and/or search result recommendations, for example. In some examples, ML model training computing device 102 transmits the trained machine learning model to item recommendation system 105.

ML model training computing device 102 may train a machine learning model using manifold learning based techniques that leverage a framework for data-dependent regularization, and that may exploit a geometry of a probability distribution. The techniques may avoid over-fitting by employing regularization to control a complexity of a classier in ambient space (e.g., vectors in high-dimensional Euclidean spaces). The training may include supervised, or semi-supervised, learning, for example.

In some examples, ML model training computing device 102 obtains aggregated customer data from database 116, which may include labelled, and unlabeled, data. Assume, for example, that the labelled and unlabeled data is represented by the following:

Labelled examples: $(x_i, y_i)$, for $i=1, \ldots l$
Unlabeled examples: $(x_i)$, $i=l+1, \ldots n$
Number of labelled examples: $l$
Number of unlabeled examples: $u=n-l$ For a supervised learning approach, ML model training computing device 102 may apply a manifold learning based algorithm that uses logistics regression (e.g., SGD) as the classifier to the labelled data. For example, the algorithm (e.g., problem) may be defined according to:

$$\min_{f \in H_k} -\frac{1}{l} \log \prod_{1}^{l} P(y_i | x_i) + \gamma_A \|f\|_K^2 = \qquad (eq.\ 1)$$

$$\min_{f \in H_k} -\frac{1}{l} \sum_{i=1}^{l} \log P(y_i | x_i) + \gamma_A \|f\|_K^2$$

-continued where:

$$P(y_1 \mid x_i) = y_i \frac{1}{1+\exp^{-\Sigma_i x_i w_i}} + (1-y_i)\frac{\exp^{-\Sigma_i x_i w_i}}{1+\exp^{-\Sigma_i x_i w_i}} = \quad (eq.\ 2)$$
$$y_i \sigma(x \cdot w) + (1-y_i)(1-\sigma(x \cdot w)) =$$
$$y_i \sigma(x \cdot w) + (1-y_i)\sigma(-x \cdot w)$$

and w is a weight vector with respect to the input x.

The gradient of the objective function with respect to w may be given by the following:

$$\frac{1}{l}\sum_{i=1}^{l}(y_i - \sigma(w \cdot x_i))x_i - \gamma_A \frac{\partial \|f\|_K^2}{\partial w} \quad (eq.\ 3)$$

Further, a solution (e.g., optimization algorithm) for the above may be represented according to:

$$f^*(x) = \Sigma_i^l \alpha_i^* K(x_i, x) \quad (eq.\ 4)$$

where:

$\alpha_i^*$ represents weighting values (e.g., weights); and

K represents an appropriate kernel function mapping pairs of x to reals.

Moreover, each weight may be updated based on a previous value of the weight and the values of one or more hyperparameters. For example, the update (e.g., SGD update) of each weight $\alpha_{(t+1)}$ may be computed according to the following update algorithm:

$$\alpha_{(t+1)} = \alpha_{(t)} + \eta[(Y^T - K\alpha^{(t)^T})K + \gamma_A a_{(t)}^T K] \quad (eq.\ 5)$$

For a semi-supervised learning approach, ML model training computing device 102 may apply a manifold learning based algorithm that uses logistics regression (e.g., SGD) as the classifier to the labelled and unlabeled data. For example, the solution (e.g., optimization algorithm) to the algorithm may be defined according to:

$$f^*(x) = \Sigma_i^{l+u} \alpha_i^* K(x_i, x) \quad (eq.\ 6)$$

Moreover, each weight may be updated based on a previous value of the weight and the values of one or more hyperparameters. For example, the update (e.g., SGD update) of each weight $\alpha_{(t+1)}$ may be computed according to the following update algorithm:

$$\alpha_{(t+1)} = \alpha_{(t)} + \eta\left[(Y^T - JK\alpha^{(t)^T})JK + \alpha^{(t)^T}\left(\gamma_A K + \frac{\gamma_I}{(u+l)^2}KLK\right)\right] \quad (eq.\ 7)$$

Execution of the above algorithms (e.g., equations 6 and 7) may achieve, in a semi-supervised learning environment, higher precision, for a minimum recall target, for each of a plurality of attributes than, for example, Bidirectional Encoder Representations from Transformers (BERT) training methods.

The below table (i.e., Table 1) illustrates a comparison of BERT to the algorithms defined by equations 6 and 7 subject to a recall target of at least 0.6, where the algorithms were trained with a tagged data set (i.e., tagged with the attributes noted below) of 1000 data points for each attribute. The test results reported below are based on 200 data points used as validation data (e.g., 200 validation test points).

TABLE 1

| Attribute | BERT | | | Model Based on Equations 6 and 7 | | |
|---|---|---|---|---|---|---|
| Metrics | Precision | Recall | F1-score | Precision | Recall | F1-score |
| alcohol type | 0.86 | 0.86 | 0.86 | 0.90 | 0.62 | 0.71 |
| alcohol type without none | 0.86 | 0.85 | 0.85 | 0.88 | 0.63 | 0.72 |
| computer keyboard type | 0.92 | 0.91 | 0.91 | 0.96 | 0.66 | 0.77 |
| computer keyboard type without none | 0.91 | 0.88 | 0.89 | 0.96 | 0.66 | 0.77 |
| fit clothing | 0.94 | 0.95 | 0.94 | 0.94 | 0.84 | 0.88 |
| fit clothing without none | 0.9 | 0.85 | 0.86 | 0.97 | 0.75 | 0.84 |
| gender | 0.98 | 0.98 | 0.98 | 0.99 | 0.67 | 0.79 |
| gender without none | 0.96 | 0.96 | 0.96 | 0.99 | 0.73 | 0.84 |
| hair product without none | 0.93 | 0.90 | 0.91 | 0.92 | 0.61 | 0.73 |
| ib computer style | 0.96 | 0.96 | 0.96 | 0.97 | 0.71 | 0.81 |
| ib computer style without none | 0.96 | 0.95 | 0.96 | 0.96 | 0.66 | 0.78 |
| Outdoor use | 0.98 | 0.99 | 0.98 | 0.99 | 0.16 | 0.27 |
| Outdoor use without none | 0.91 | 0.94 | 0.92 | 0.99 | 0.65 | 0.77 |

In some examples, ML model training computing device 102 updates the weights until a difference between a current value and a previous value is less than or equal to a threshold. For example, ML model training computing device 102 may execute iterations of equation 7 for each weight α until the following is satisfied:

$$\alpha_{(t+1)} - \alpha_{(t)} \leq \text{threshold} \quad (eq.\ 8)$$

Figure 2:
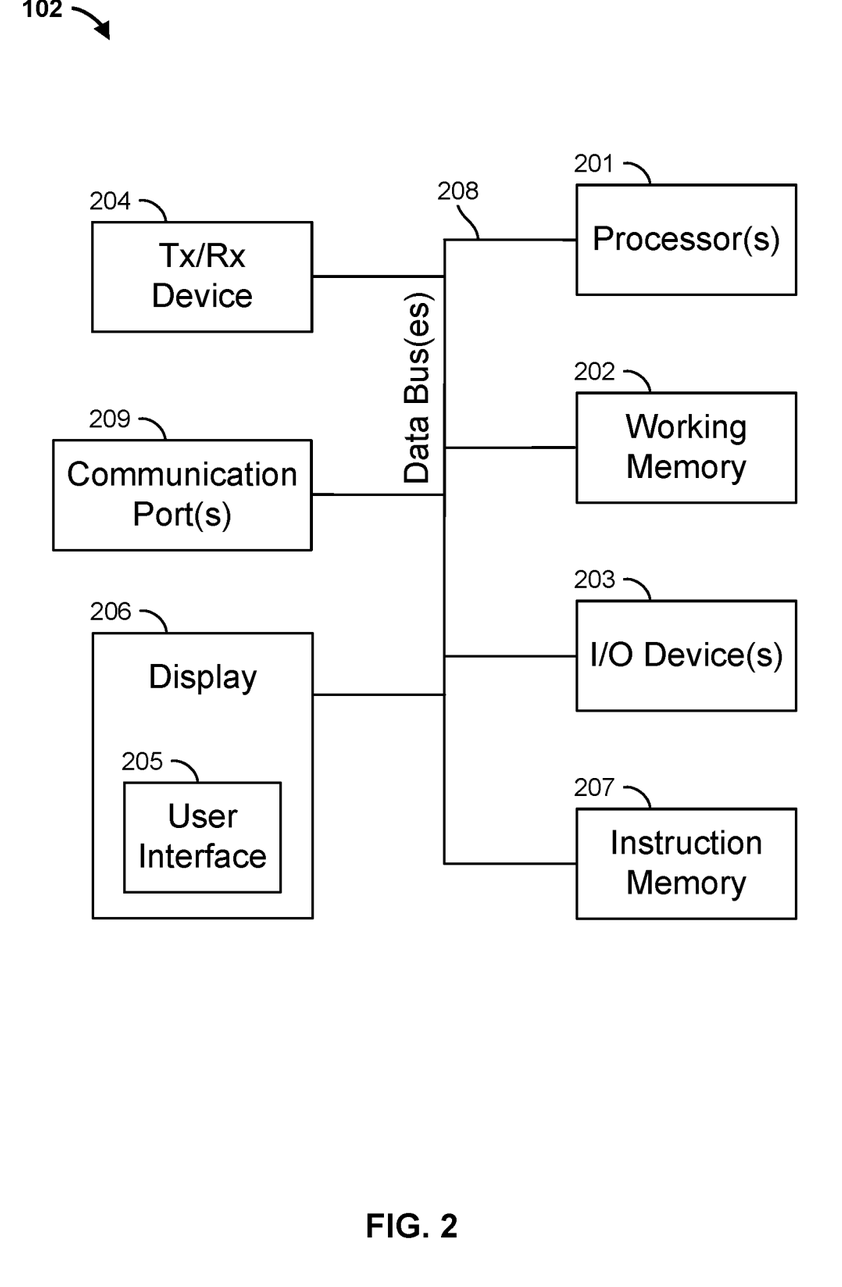
FIG. 2 is a block diagram of the machine learning (ML) model training computing device of the advertisement system of FIG. 1 in accordance with some embodiments.

The above threshold may be configured by a user via user interface 205, for example, and stored in database 116. In some examples, the threshold is 0.5.

In some examples, item recommendation system 105 transmits data identifying and characterizing a machine learning model to ML model training computing device 102 for training. ML model training computing device 102 may train the machine learning model, for example, based on equations 7 and 8 above, and transmit data identifying and characterizing the trained machine learning model to item recommendation system 105. For example, ML model training computing device 102 may train the machine learning model to learn the value of one or more weights (e.g., $a_i$) for the machine learning model, and transmit the values to item recommendation system 105.

Item recommendation system 105 may receive a request for recommended items to advertise to a user. For example, web server 104 may host a website, such as a retailer's website, and may send a request to item recommendation system 105 for recommended items to advertise to a customer browsing the website. Item recommendation system 105 may apply the trained machine learning model (e.g., including the received weights) to customer session data, customer purchase data, and product data to determine one or more items (e.g., or item categories) to advertise to the user. Item recommendation system 105 may transmit data identifying and characterizing the items (e.g., or item categories) to web server 104, and web server 104 may display advertisements for the items (e.g., or the item categories) to the customer. For example, web server 104 may display the advertisements on a homepage, an item webpage, or an item category webpage of the website the customer is browsing.

In some examples, ML model training computing device 102 obtains training data for training a machine learning model comprising a plurality of hyperparameters and a plurality of coefficients, and generates a first training dataset based on the obtained training data. ML model training computing device 102 may apply the machine learning model to the first training set to generate first output data. Further, ML model training computing device 102 may apply a loss algorithm to the first training dataset and the first output data to generate a first loss value. ML model training computing device 102 may also determine a first updated value for each of the plurality of coefficients based on the first loss value and a corresponding previous value of each of the plurality of coefficients. In some examples, ML model training computing device 102 randomly determines an initial value for each of the plurality of coefficients. ML model training computing device 102 may store the first updated value for each of the plurality of coefficients in a data repository.

In some examples, ML model training computing device 102 generates a second training dataset based on the obtained training data, and applies the machine learning model with the updated values of the plurality of coefficients to the second training set to generate second output data. Further, ML model training computing device 102 may apply the loss algorithm to the second training dataset and the second output data to generate a second loss value, and determine a second updated value for each of the plurality of coefficients based on the second loss value and the first updated value of each of the plurality of coefficients. ML model training computing device 102 may store the second updated value for each of the plurality of coefficients in the data repository.

In some examples, ML model training computing device 102 determines that updating of the plurality of coefficients is not complete based on the first updated value and the corresponding previous value for at least one of the plurality of coefficients. For example, ML model training computing device 102 may compare the first updated value and the corresponding previous value for the at least one of the plurality of coefficients, and determine that a threshold is not met.

In some examples, ML model training computing device 102 determines whether the training data comprises labelled data. If the training data comprises labelled data, ML model training computing device 102 determines the first updated value for each of the plurality of coefficients according to equation 7 above. If the training data does not comprise labelled data, ML model training computing device 102 determines the first updated value for each of the plurality of coefficients according to equation 5 above.

FIG. 2 illustrates an example of the ML model training computing device 102 of FIG. 1. ML model training computing device 102 can include one or more processors 201, working memory 202, one or more input-output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more processing cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of ML model training computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with ML model training computing device 102. For example, user interface 205 can be a user interface for an application that allows a user to select machine learning models to train, and to further select labelled and/or unlabeled data, such as labelled and/or unlabeled product data, to be used for the training. For example, the user may select whether to train the machine learning model using supervise, or semi-supervised, learning. In some examples, a user can interact with user interface 205 by engaging input-output devices 203. In some examples, display 206 can be a touchscreen, where user interface 205 is displayed by the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 ML model training computing device 102 will be operating in. Processor(s) 201 is operable to receive data from, or send data to, a network, such as communication network 118 of FIG. 1, via transceiver 204.

Figure 3:
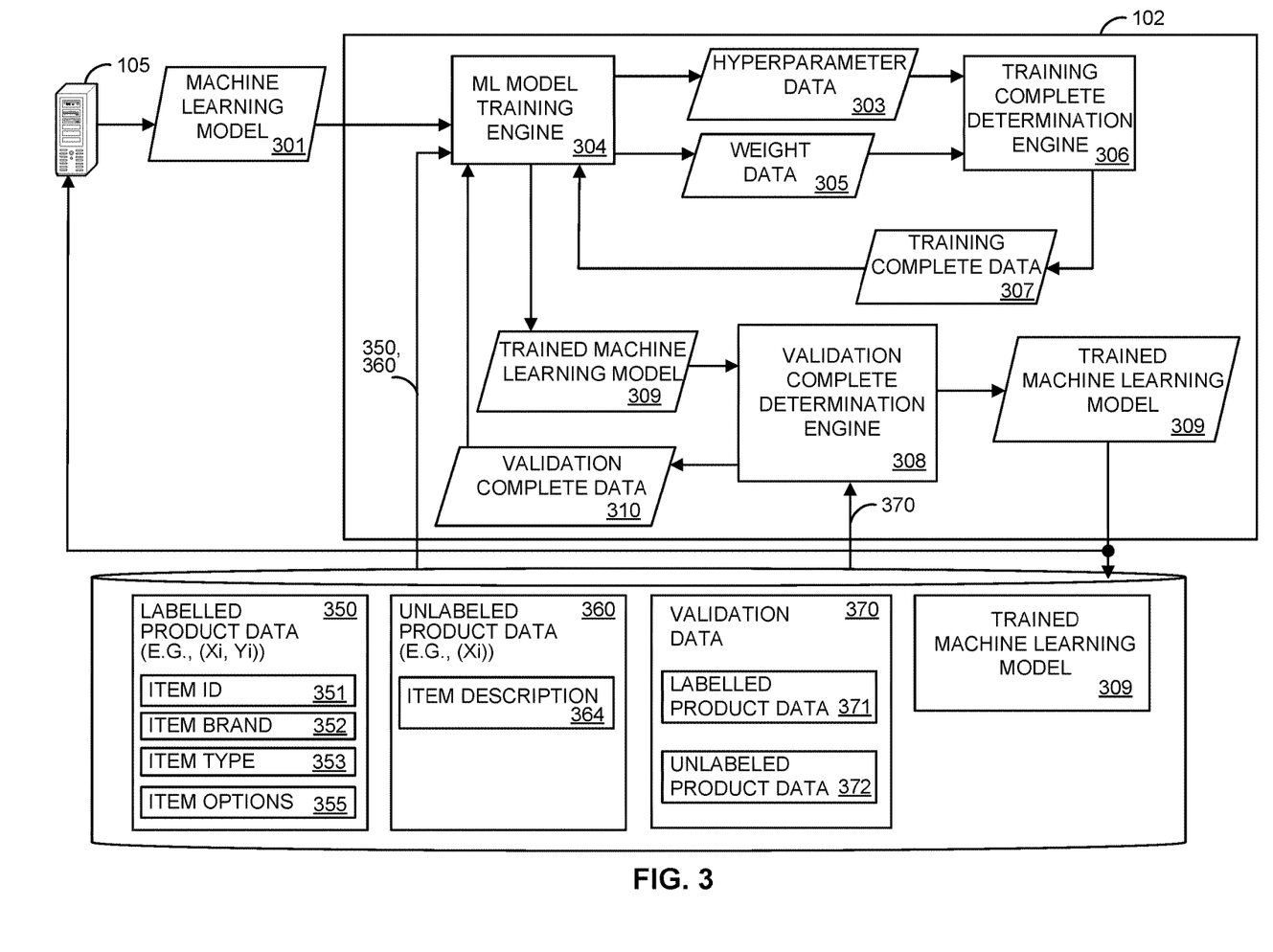
FIG. 3 is a block diagram illustrating examples of various portions of the advertisement system of FIG. 1 in accordance with some embodiments.

FIG. 3 is a block diagram illustrating examples of various portions of the advertisement system 100 of FIG. 1. As indicated in the figure, ML model training computing device 102 includes ML model training engine 304, training complete determination engine 306, and validation complete determination engine 308. In some examples, one or more of ML model training engine 304, training complete determination engine 306, and validation complete determination engine 308 may be implemented in hardware. In some examples, one or more of ML model training engine 304, training complete determination engine 306, and validation complete determination engine 308 may be implemented as an executable program maintained in a tangible, non-transitory memory, such as instruction memory 207 of FIG. 2, that may be executed by one or processors, such as processor 201 of FIG. 2.

In this example, ML model training engine 304 receives a machine learning model 301 from item recommendation system 105. For example, item recommendation system 105 may transmit the machine learning model 301 to ML model training computing device 102 for training. ML model training engine 304 may further obtain training data from database 116 for training machine learning model 301. The training data may include labelled product data 350 and/or unlabeled product data 360. For example, a user may configure ML model training engine 304 (e.g., via user interface 205) to train machine learning model 301 with either labelled product data 350, or with both labelled product data 350 and unlabeled product data 360.

Labelled product data 350 may include, for each of a plurality of products, any labelled product data. In this example, labelled product data 350 may include an item identifier (ID) 351 (e.g., labelled as an item ID), an item brand 352 (e.g., labelled as an item brand), an item type 353 (e.g., labeled as an item type such as meat, fruit, vegetable, etc.), and item options 355 (e.g., each item option, such as color, amount, height, flavor, etc. correspondingly labelled). Unlabeled product data 360 may include, for each of a plurality of products, any unlabeled product data. In this example, unlabeled product data 360 includes an item description 364, which may include text (e.g., sentences) describing each product. For example, item description 364 may include text describing the brand of, the type of, the title of, and/or options for the product, but not labelled as such.

ML model training engine 304 may train the machine learning model 301 by executing a logistic regression (e.g., SGD) based model to determine a weight value for each of one or more weights applied to hyperparameters of machine learning model 301. For example, for supervised learning, ML model training engine 304 may execute a model corresponding to equations 4 and 5 as described above. For semi-supervised learning, ML model training engine 304 may execute a model corresponding to equations 6 and 7 as described above. ML model training engine 304 may generate hyperparameter data 303 identifying each hyperparameter of machine learning model 301, and weight data 305 identifying a current weight value for each weight (e.g., $a_i$) applied to the hyperparameters.

Training complete determination engine 306 receives hyperparameter data 303 and weight data 305 from training data generation engine 304, and performs operations to determine whether training of each weight is complete. For example, training complete determination engine 306 may determine that training of a hyperparameter weight is complete by determining a difference between a current value of the weight and a previous value of the weight, and comparing the difference to a threshold. If the difference is less than or equal to the threshold, training of the hyperparameter weight is complete. Otherwise, if the difference is greater than the threshold, training of the hyperparameter weight is not complete. Training complete determination engine 306 generates training complete data 307 identifying whether training of each hyperparameter weight is complete. For example, training complete data 307 may identify each hyperparameter identified in hyperparameter data 303, and a corresponding status value (e.g., 0=not compete, 1=complete).

Training data generation engine 304 may determine whether to continue training machine learning model 301 based on receiving training complete data 307. For example, if training complete data 307 indicates training is not complete, training data generation engine 304 continues to train machine learning model 301. Otherwise, if training complete data 307 indicates training is complete, training data generation engine 304 ends the training of machine learning model 301, and provides trained machine learning model 309 to validation complete determination engine 308. Trained machine learning model 309 may include machine learning model 301 with the trained weights (e.g., updated weight values), for example.

Validation complete determination engine 308 may perform operations to validate trained machine learning model 309. For example, validation complete determination engine 308 may apply trained machine learning model 309 to validation data 370 to generate output data. Validation 370 includes data different from, for example, labelled product data 350 and unlabeled product data 360. Validation data 370 may include, for example, labelled data 371 and unlabeled data 372 for each of a plurality of products. Validation complete determination engine 308 may apply the trained machine learning model 309 to a predetermined amount of validation data 370. For example, validation complete determination engine 308 may apply the trained machine learning model 309 to validation data 370 corresponding to a predetermined period, such as a particular 3 month period.

Further, validation complete determination engine 308 may determine one or more metrics, such as precision, recall, and F1-score metrics, based on the generated output data. Validation complete determination engine 308 may determine if validation of the trained machine learning model 309 is complete based on one or more of the metrics. For example, validation complete determination engine 308 may determine whether a first metric, such as precision, is at least a first threshold amount, and a second metric, such as recall, is at least a second threshold amount. Each of the first threshold and second threshold amounts may be preconfigured by a user via user interface 205, for example. Validation complete determination engine 308 generates validation complete data 310 identifying whether the trained machine learning model 309 has been validated (e.g., 0=not validated, 1=validated), and provides validation complete data 310 to training data generation engine 304.

If validation complete data 310 identifies that the trained machine learning model 309 has not been validated, training data generation engine 304 will continue to train trained machine learning model 309. For example, training data generation engine 304 will obtain additional labelled product data 350 and/or unlabeled product data 360, and determine updated weight values applied to the hyperparameters of trained machine learning model 309.

If, however, validation complete data 310 identifies that the trained machine learning model 309 has been validated, validation complete determination engine 308 stores trained machine learning model 309 in database 116. In some examples, validation complete determination engine 308 transmits trained machine learning model 309 to item recommendation system 105. Item recommendation system 105 may apply the trained machine learning model to data to generate predicted outputs, such as item recommendations.

Figure 4:
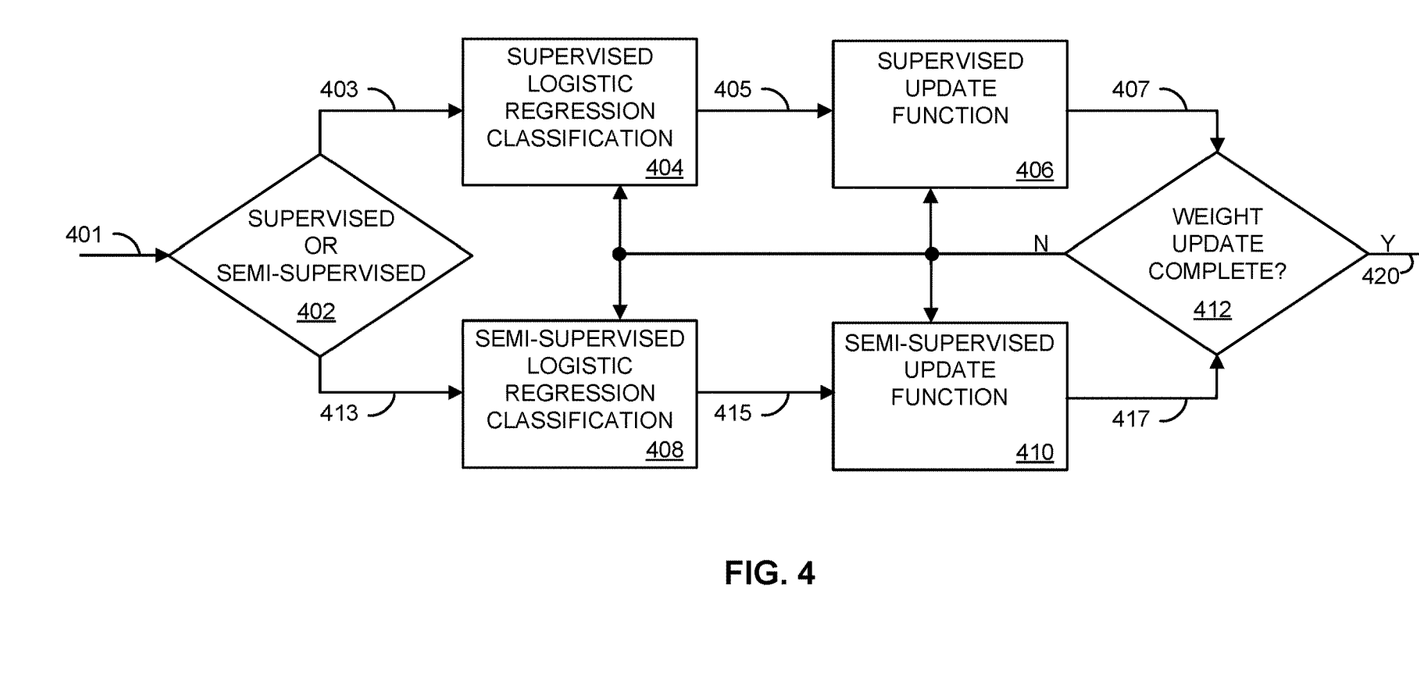
FIG. 4 is a block diagram illustrating examples of various portions of the ML model training computing device of FIG. 1 in accordance with some embodiments.

FIG. 4 illustrates a block diagram of exemplary portions of ML model training computing device 102. For example, the illustrated portions may be implemented by one or more of ML model training engine 304, training complete determination engine 306, and validation complete determination engine 308. In this example, a learning type decision block 402 determines whether a machine learning model 401 is to be trained using supervised, or semi-supervised, learning. The determination may be made, for example, based on a user provided configuration setting.

Assuming supervised learning is determined (e.g., selected), labelled training data 403 is provided to supervised logistic regression classification block 404. Supervised logistic regression classification block 404 may determine weight values for hyperparameters of machine learning model 401 based on using logistics regression (e.g., SGD) as a base classifier. For example, supervised logistic regression classification block 404 may apply the solution form of equation 4 above to the labelled training data 403 to generate supervised output data 405. Supervised logistic regression classification block 404 may provide the supervised output data 405, which may include current hyperparameter weight values, to supervised update function 406. Supervised update function 406 may update the hyperparameter weights based on an update function, such as an update function corresponding to equation 5 above. Supervised update function 406 provides the updated hyperparameter weights to weight update complete decision block 412.

Back at learning type decision block 402, and assuming semi-supervised learning is determined (e.g., selected), labelled and unlabeled training data 413 is provided to semi-supervised logistic regression classification block 408. Semi-supervised logistic regression classification block 408 may determine weight values for hyperparameters of machine learning model 401 based on using logistics regression (e.g., SGD) as a base classifier. For example, semi-supervised logistic regression classification block 408 may apply the solution form of equation 6 above to the labelled and unlabeled training data 413 to generate semi-supervised output data 415. Semi-supervised logistic regression classification block 408 may provide the semi-supervised output data 415, which may include current hyperparameter weight values, to semi-supervised update function 410. Semi-supervised update function 410 may update the hyperparameter weights based on an update function, such as an update function corresponding to equation 7 above. Semi-supervised update function 410 provides the updated hyperparameter weights to weight update complete decision block 412.

Weight update complete decision block 412 may determine if the hyperparameter weights have been sufficiently trained. For example, update complete decision block 412 may determine that a hyperparameter has been sufficiently trained once the difference between a current value and immediate previous value for the weight is within a threshold. If the hyperparameter weights for the machine learning model 401 are not sufficiently trained, training continues. Otherwise, if the hyperparameter weights for the machine learning model 401 are sufficiently trained, weight update complete decision block 412 provides the updated machine learning model 420.

Figure 5:
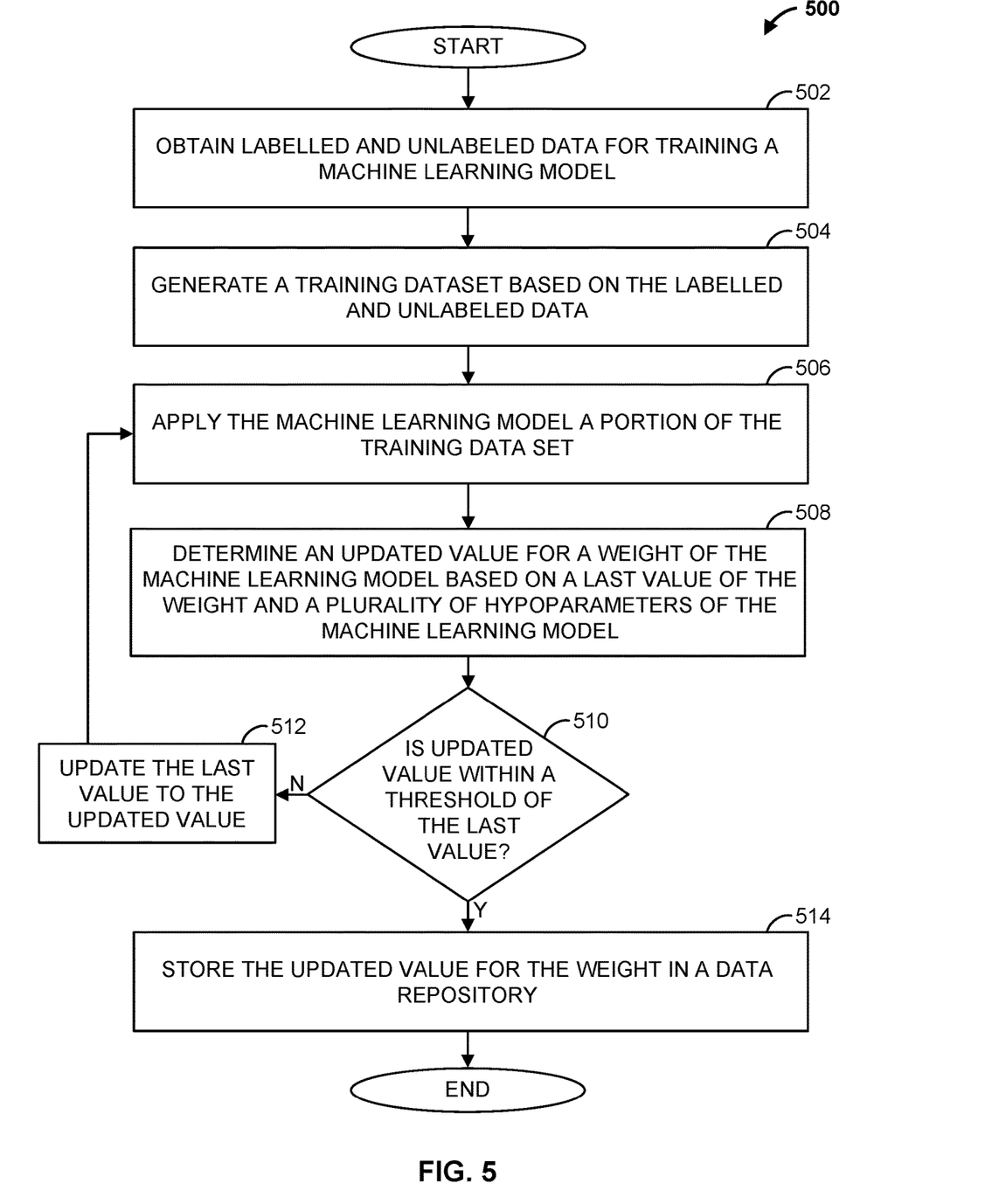
FIG. 5 is a flowchart of an example method that can be carried out by the advertisement system of FIG. 1 in accordance with some embodiments.

FIG. 5 is a flowchart of an example method 500 that can be carried out by the advertisement system 100 of FIG. 1. Beginning at step 502, a computing device, such as ML model training computing device 102, obtains labelled and unlabeled data for training a machine learning model. At step 504, a training dataset is generated based on the labelled and unlabeled data. For example, the computing device may generate a training dataset based on a portion of the labelled and unlabeled data corresponding to a length of time (e.g., 3 months).

At step 506, the machine learning model is applied to a portion of the training dataset. For example, the computing device may apply a logistics regression (e.g., SGD) base classifier to the portion of the training dataset, such as a solution corresponding to equation 6. At step 508, an updated value for a weight of the machine learning model is determined based on a last (e.g., previous) value of the weight, and a plurality of hyperparameters of the machine learning model. For example, the updated value may be determined based on an SGD update function, such as the update function of equation 7.

Proceeding to decision block 510, a determination is made as to whether the updated value is within a threshold of the last value. For example, the computing device may determine if the updated value for the weight is within 0.5 of the weight's previous value. If the updated value is not within the threshold of the last value, the method proceeds to step 512, where the last value of the weight is changed to be the updated value. The method then proceeds back to step 506, where the machine learning model is applied to a different portion of the training dataset.

If, however, at decision block 510, the updated value is within the threshold of the last value, the method proceeds to step 514, where the updated value is stored in a data repository. For example, the computing device may store the updated value in database 116. The method then ends.

Figure 6:
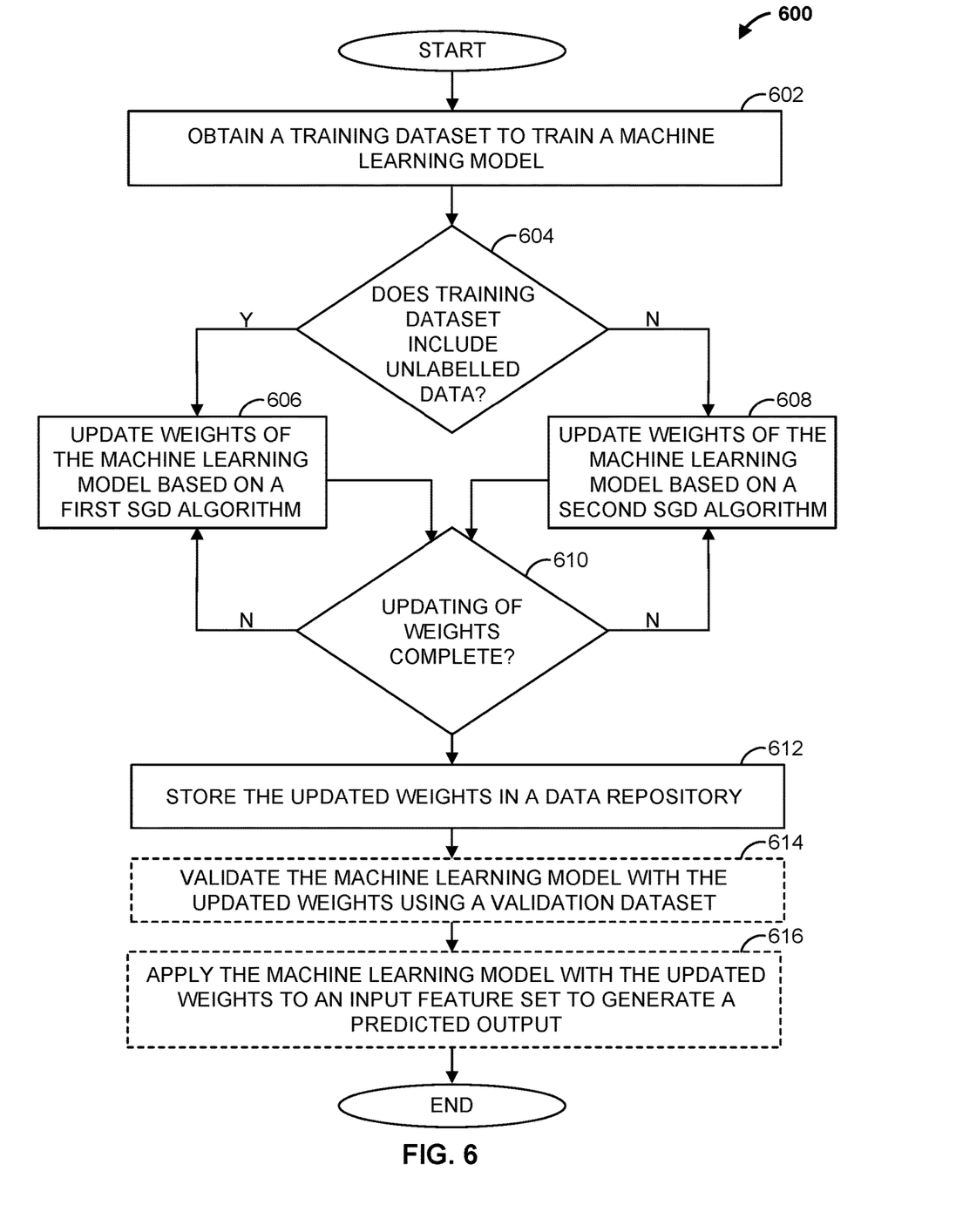
FIG. 6 is a flowchart of another example method that can be carried out by the advertisement system of FIG. 1 in accordance with some embodiments.

FIG. 6 is a flowchart of an example method 600 that can be carried out by the advertisement system 100 of FIG. 1. At step 602, a computing device, such as ML model training computing device 102, obtains a training dataset to train a machine learning model. At decision step 604, a determination is made as to whether the training dataset includes unlabeled data. For example, the computing device may determine, based on a user input (e.g., a configuration setting), if the training dataset includes unlabeled data. If the training dataset includes unlabeled data (e.g., semi-supervised learning), the method proceeds to step 606. At step 606, weights of the machine learning model are updated based on a first SGD algorithm. For example, the computing device may apply a model such as one corresponding to equation 6. The method then proceeds to step 610.

If, however, at decision step 604, the training dataset does not include unlabeled data (e.g., supervised learning), the method proceeds to step 608. At step 608, weights of the machine learning model are updated based on a second SGD algorithm. For example, the computing device may apply a model such as one corresponding to equation 4. The method then proceeds to decision step 610.

At decision step 610, a determination is made as to whether the updating of the weights is complete. For example, the computing device may determine whether the updating of the weights is complete based on equation 8 described above. If the updating of the weights is not complete, the method proceeds back to either step 606, or step 608, depending on which step was followed, for further weight updates. If, however, the updating of the weights is complete, the method proceeds to step 612, where the updated weights are stored in a data repository, such as within database 116.

Optionally, at step 614, the machine learning model is validated. For example, the computing device may apply the machine learning model with the updated weights to a validation dataset. The computing device may further determine that the machine learning model is validated based on determining that one or more metrics satisfy corresponding threshold. Optionally, at step 616, the machine learning model with the updated weights is applied to an input feature set to generate a predicted output. For example, after validation, the computing device may apply the trained and validated machine learning model to product data to identify features of the product data. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system, comprising:
a computing device configured to:
obtain training data for training a machine learning model comprising a plurality of hyperparameters and a plurality of coefficients;
generate a first training dataset based on the obtained training data;
train the machine learning model by applying the machine learning model to the first training dataset to generate first output data;
apply a loss algorithm to the first training dataset and the first output data to generate a first loss value;
determine a first updated value for each of the plurality of coefficients based on the first loss value and a corresponding previous value of each of the plurality of coefficients;
in accordance with a determination that the first updated value for each of the plurality of coefficients is outside of a threshold of a last value:
generate a second training dataset based on the obtained training data, wherein the second training dataset is different from the first training dataset;
retrain the machine learning model by applying the machine learning model with the first updated values of the plurality of coefficients to the second training dataset to generate second output data;
apply the loss algorithm to the second training dataset and the second output data to generate a second loss value;
determine a second updated value for each of the plurality of coefficients based on the second loss value and the first updated value of each of the plurality of coefficients;
generate a comparison value based on the first updated value for each of the plurality of coefficients of the machine learning model and the second updated value for each of the plurality of coefficients for each of the plurality of coefficients of the machine learning model;
determine that the comparison value is less than or equal a predetermined threshold; and
store, in a database associated with the computing device, the first updated value and the second updated value for each of the plurality of coefficients in a data repository; and
apply the first updated value and the second update value for each of the plurality of coefficient in a data repository from a source external to the computing device to generate predicted outputs.

2. The system of claim 1, wherein the computing device is further configured to determine that updating of the plurality of coefficients is not complete based on the first updated value and the corresponding previous value for at least one of the plurality of coefficients.

3. The system of claim 2, wherein determining that updating of the plurality of coefficients is not complete comprises comparing the first updated value and the corresponding previous value for the at least one of the plurality of coefficients, and determining that a threshold is not met.

4. The system of claim 1, wherein the loss algorithm is based on logistics regression.

5. The system of claim 1, wherein the computing device is configured to:
receive the machine learning model from an item recommendation system; and
transmit the first updated value for each of the plurality of coefficients to the item recommendation system.

6. The system of claim 1, wherein the training data comprises labelled and unlabeled training data.

7. The system of claim 1, wherein the computing device is further configured to validate the machine learning model by:
applying the machine learning model to validation data to generate second output data; and
determining that a metric is satisfied based on the second output data.

8. The system of claim 1, wherein the computing device is configured to randomly determine an initial value for each of the plurality of coefficients.

9. The system of claim 1, wherein the computing device is configured to train the machine learning model by applying the machine learning model to the first training dataset to generate the first output data by using manifold learning-based techniques that leverage a framework for data-dependent regularization, and a geometry of a probability distribution.

10. The system of claim 1, wherein the predetermined threshold is preconfigurable by a user via a user interface.

11. The system of claim 10, wherein the user interface enables the user to select labelled and/or unlabeled data to be used for the training the machine learning model.

12. The system of claim 10, wherein the user interface enables the user to select whether to train the machine learning model using supervised or semi-supervised learning.

13. The system of claim 12, wherein the computing device comprises a processor and a non-transitory memory storing instructions, that when executed, cause the processor to apply a manifold learning-based algorithm that uses logistics regression as a classifier for labelled training data and/or unlabeled training data.

14. A method comprising:
   obtaining training data for training a machine learning model comprising a plurality of hyperparameters and a plurality of coefficients;
   generating a first training dataset based on the obtained training data;
   training the machine learning model by applying the machine learning model to the first training dataset to generate first output data;
   applying a loss algorithm to the first training dataset and the first output data to generate a first loss value;
   determining a first updated value for each of the plurality of coefficients based on the first loss value and a corresponding previous value of each of the plurality of coefficients;
   in accordance with a determination that the first updated value for each of the plurality of coefficients is outside of a threshold of a last value:
      generating a second training dataset based on the obtained training data, wherein the second training dataset is different from the first training dataset;
      retraining the machine learning model by applying the machine learning model with the first updated values of the plurality of coefficients to the second training dataset to generate second output data;
      applying the loss algorithm to the second training dataset and the second output data to generate a second loss value;
      determining a second updated value for each of the plurality of coefficients based on the second loss value and the first updated value of each of the plurality of coefficients;
      generating a comparison value based on the first updated value for each of the plurality of coefficients of the machine learning model and the second updated value for each of the plurality of coefficients of the machine learning model;
      determining that the comparison value is less than or equal a predetermined threshold; and
      storing, in a database associated with a computing device, the first updated value and the second updated value for each of the plurality of coefficients in a data repository; and
   applying the first updated value and the second update value for each of the plurality of coefficient in a data repository on data received from a source external to the computing device to generate predicted outputs.

15. The method of claim 14 wherein the training data comprises labelled and unlabeled training data.

16. The method of claim 14, further comprising validating the machine learning model by:
   applying the machine learning model to validation data to generate second output data; and
   determining that a metric is satisfied based on the second output data.

17. A non-transitory computer readable medium having instructions stored thereon, wherein the instructions, when executed by at least one processor, cause a device to perform operations comprising:
   obtaining training data for training a machine learning model comprising a plurality of hyperparameters and a plurality of coefficients;
   generating a first training dataset based on the obtained training data;
   training the machine learning model by applying the machine learning model to the first training dataset to generate first output data;
   applying a loss algorithm to the first training dataset and the first output data to generate a first loss value;
   determining a first updated value for each of the plurality of coefficients based on the first loss value and a corresponding previous value of each of the plurality of coefficients;
   in accordance with a determination that the first updated value for each of the plurality of coefficients is outside of a threshold of a last value:
      generating a second training dataset based on the obtained training data, wherein the second training dataset is different from the first training dataset;
      retraining the machine learning model by applying the machine learning model with the first updated values of the plurality of coefficients to the second training dataset to generate second output data;
      applying the loss algorithm to the second training dataset and the second output data to generate a second loss value;
      determining a second updated value for each of the plurality of coefficients based on the second loss value and the first updated value of each of the plurality of coefficients;
      generating a comparison value based on the first updated value for each of the plurality of coefficients of the machine learning model and the second updated value for each of the plurality of coefficients of the machine learning model;
      determining that the comparison value is less than or equal a predetermined threshold; and
      storing, in a database associated with the device, the first updated value and the second updated value for each of the plurality of coefficients in a data repository; and
   applying the first updated value and the second update value for each of the plurality of coefficient in a data repository on data received from a source external to the device to generate predicted outputs.

18. The non-transitory computer readable medium of claim 17, wherein the training data comprises labelled and unlabeled training data.

* * * * *